(12) United States Patent
Yang et al.

(10) Patent No.: US 10,854,858 B2
(45) Date of Patent: Dec. 1, 2020

(54) CASE FOR RECHARGEABLE BATTERY AND RECHARGEABLE BATTERY COMPRISING THE SAME

(71) Applicant: SAMSUNG SDI CO., LTD., Yongin-si (KR)

(72) Inventors: Jung-Yup Yang, Yongin-si (KR); Jun-Won Suh, Yongin-si (KR); Jeong-Doo Yi, Yongin-si (KR); Jan-Dee Kim, Yongin-si (KR); Bong-Kyoung Park, Yongin-si (KR); Ju-Hyeong Han, Yongin-si (KR); Ju-Hee Sohn, Yongin-si (KR); Da-Woon Han, Yongin-si (KR); Hye-Ri Eom, Yongin-si (KR); Hyun-Hwa Song, Yongin-si (KR); Sol Choi, Yongin-si (KR); Seok-Hun Hong, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 9 days.

(21) Appl. No.: 15/338,524

(22) Filed: Oct. 31, 2016

(65) Prior Publication Data
US 2017/0149026 A1    May 25, 2017

(30) Foreign Application Priority Data
Nov. 23, 2015    (KR) .......................... 10-2015-0163919

(51) Int. Cl.
*H01M 2/02*    (2006.01)
*H01M 2/08*    (2006.01)

(52) U.S. Cl.
CPC ......... *H01M 2/0287* (2013.01); *H01M 2/026* (2013.01); *H01M 2/029* (2013.01);
(Continued)

(58) Field of Classification Search
CPC .. H01M 2/026; H01M 2/0275; H01M 2/0277; H01M 2/0287; H01M 2/029; H01M 2/08
See application file for complete search history.

(56) References Cited

U.S. PATENT DOCUMENTS 3,892,593 A    7/1975    Ieki et al.
4,409,051 A *  10/1983   Ciliberti, Jr. ........... B65D 59/00
                                              156/212
(Continued)

FOREIGN PATENT DOCUMENTS

EP    2 869 358 A1    5/2015
GB    105385          4/1917
(Continued)

OTHER PUBLICATIONS

Skeist, Irving, "Handbook of Adhesives", Van Nostrand Reinhold Co., 1977, p. 256 (Year: 1977).*

(Continued)

*Primary Examiner* — Victoria H Lynch
(74) *Attorney, Agent, or Firm* — Lee IP Law, P.C.

(57) ABSTRACT

A case for a rechargeable battery and a rechargeable battery including the case, the case including a sequentially deposited first resin layer and second resin layer, wherein the second resin layer includes a butyl-based resin.

13 Claims, 9 Drawing Sheets

(52) U.S. Cl.
CPC ....... *H01M 2/0275* (2013.01); *H01M 2/0277* (2013.01); *H01M 2/08* (2013.01)

(56) References Cited

U.S. PATENT DOCUMENTS

| | | | |
|---|---|---|---|
| 2003/0148179 A1 | 8/2003 | Uyama et al. | |
| 2003/0232243 A1* | 12/2003 | Hong | H01M 2/1653 429/161 |
| 2007/0207379 A1 | 9/2007 | Hatta et al. | |
| 2009/0136833 A1 | 5/2009 | Lee et al. | |
| 2009/0297949 A1* | 12/2009 | Berkowitz | H01M 2/08 429/221 |
| 2013/0052510 A1* | 2/2013 | Miyazaki | H01M 2/08 429/156 |
| 2014/0377636 A1 | 12/2014 | Sung et al. | |
| 2015/0104698 A1* | 4/2015 | Fung | H01M 2/0285 429/175 |
| 2016/0087250 A1 | 3/2016 | Gu et al. | |
| 2016/0133882 A1* | 5/2016 | Lee | H01M 2/026 429/176 |
| 2017/0093001 A1* | 3/2017 | Kim | H01M 4/382 |
| 2018/0076422 A1* | 3/2018 | Amano | B32B 15/08 |

FOREIGN PATENT DOCUMENTS

| | | | | |
|---|---|---|---|---|
| JP | 2000-173564 | A | 6/2000 | |
| JP | 2001-351587 | A | 12/2001 | |
| KR | 2000-0039287 | A | 7/2000 | |
| KR | 101132169 | B1 * | 4/2012 | ............ H01M 10/02 |
| KR | 10-2013-0081446 | A | 7/2013 | |
| KR | 10-2014-0134185 | A | 11/2014 | |
| KR | 10-1470058 | B1 | 12/2014 | |
| KR | 10-2015-0012853 | A | 2/2015 | |
| KR | 10-2015-0026489 | A | 3/2015 | |

OTHER PUBLICATIONS

Machine translation KR101132169(B1) (Year: 2012).*
Extended European Search Report dated May 15, 2017, of the corresponding European Patent Application No. 16199829.9.
European Office Action dated Feb. 8, 2018, of the corresponding European Patent Application No. 16199829.9.
Chinese Office Action dated Sep. 29, 2019 including Search Report.
Chinese Office action dated Jul. 1, 2020 with Chinese Search Report dated Jun. 21, 2020.

* cited by examiner

CASE FOR RECHARGEABLE BATTERY AND RECHARGEABLE BATTERY COMPRISING THE SAME

CROSS-REFERENCE TO RELATED APPLICATION

Korean Patent Application No. 10-2015-0163919, filed on Nov. 23, 2015, in the Korean Intellectual Property Office, and entitled: "Case for Rechargeable Battery and Rechargeable Battery Comprising the Same," is incorporated by reference herein in its entirety.

BACKGROUND

1. Field

Embodiments relate to a case for a rechargeable battery and a rechargeable battery including the same.

2. Description of the Related Art

A rechargeable battery includes an electrode assembly having a positive electrode and a negative electrode, a separator interposed between the positive electrode and the negative electrode, and a case receiving the electrode assembly. The case of the rechargeable battery may be made from various structures, e.g., a pouch-type case, a metal case, and a polymer case.

The above information disclosed in this Background section is only to enhance the understanding of the background of the disclosure, and therefore it may contain information that does not form the prior art that is already known in this country to a person of ordinary skill in the art.

SUMMARY

Embodiments are directed to a case for a rechargeable battery and a rechargeable battery including the same.

The embodiments may be realized by providing a case for a rechargeable battery, the case including a sequentially deposited first resin layer and second resin layer, wherein the second resin layer includes a butyl-based resin.

The butyl-based resin may include a poly isobutylene rubber, a copolymer rubber of poly isobutylene and isoprene, a halogenated butyl rubber, an acrylonitrile butadiene rubber, a poly sulfide butadiene rubber, or a styrene butadiene rubber.

The butyl-based resin may include the halogenated butyl rubber, and the halogenated butyl rubber may include a bromo-butyl rubber or a chloro-butyl rubber.

A Young's modulus of the second resin layer may be 0.05 MPa to 500 MPa.

A yield stress of the second resin layer may be 0.1 MPa to 100 MPa.

An Elastic elongation of the second resin layer may be less than 500%.

The first resin layer may include polyethylene terephthalate, polybutylene terephthalate, a copolyester, a polycarbonate, or a nylon film.

The case may further include a third resin layer, wherein the first resin layer is on one surface of the second resin layer and the third resin layer is on another surface of the second resin layer.

The third resin layer may include a polyolefin or a copolymer of polyolefin.

The polyolefin may be poly ethylene or poly propylene.

The embodiments may be realized by providing a rechargeable battery including an electrode assembly; and a case receiving the electrode assembly, wherein the case is the case according to an embodiment.

The case may include a first receiving part and a sealing part, the first receiving part accommodates the electrode assembly and includes an opening at one side thereof, and the sealing part seals the opening.

The sealing part may include directly adhered parts of the case at an end of the first receiving part.

The case may include a second receiving part and a cover part, the second receiving part accommodates the electrode assembly and includes an opening at one side thereof, and the cover part closes and seals the opening.

The second receiving part may be directly adhered to the cover part to closed and sealed.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals designate like elements throughout the specification.

In addition, unless explicitly described to the contrary, the word "comprise" or "include," and variations such as "comprises," "includes," or "comprising", will be understood to imply the inclusion of stated elements but not the exclusion of any other elements. Herein, the term "or" is not an exclusive term, and may have the same meaning as "and/or."

A pouch-type case may be configured of an inner resin layer, a metal thin layer, and an outer resin layer. However, if the inner resin layer were to be damaged, e.g., by stress during the manufacturing process in the pouch-type case having this structure, the metal thin layer could be exposed to and may react with the electrolyte solution. As a result, corrosion of the pouch case could occur, and the electrolyte solution could leak out.

In addition, demand for a wearable electronic device has recently continued to increase, and demand for a rechargeable battery having excellent flexibility has increased as well. However, some pouch-type cases include a metal thin layer, and strain such as a wrinkling may be generated when bent, such that the flexibility of the rechargeable battery may be decreased.

According to an embodiment, when including a resin layer formed using a butyl-based resin (instead of a metal thin layer), the case for a rechargeable battery may have excellent chemical resistance and flexibility.

For example, the case according to an exemplary embodiment may include a sequentially deposited first resin layer and second resin layer. The second resin layer may be formed using, e.g., a butyl-based resin. For example, the second resin layer may include a butyl-based resin or butyl group-containing compound resin.

Figure 1:
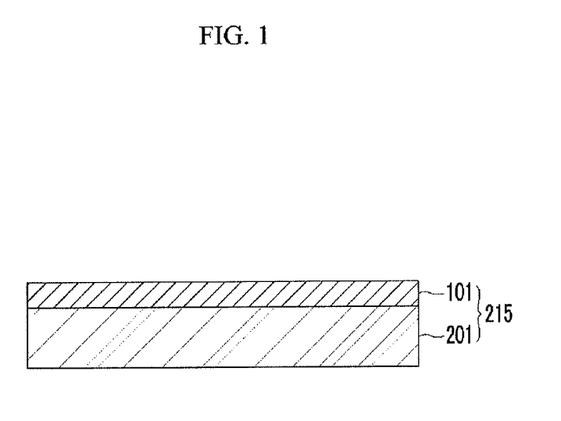
FIG. 1 and FIG. 2 illustrate sectional views showing a case for a rechargeable battery according to an exemplary embodiment.

FIG. 1 illustrates a sectional view of a case for a rechargeable battery according to an embodiment.

As shown in FIG. 1, the case 215 for the rechargeable battery according to an embodiment may include the first resin layer 101 and the second resin layer 201. In an implementation, the first resin layer 101 and the second resin layer 201 may each independently be configured of one layer or a resin composite layer made of at least two or more layers.

In an implementation, the first resin layer 101 may be an outer layer functioning as a protection layer of the case 215.

In an implementation, the first resin layer 101 may be formed of or include, e.g., polyethylene terephthalate, polybutylene terephthalate, a copolyester, a polycarbonate, or a nylon film.

In an implementation, a thickness of the first resin layer 101 may be, e.g., 10 μm to 100 μm or 10 μm to 50 μm. Maintaining the thickness of the first resin layer 101 at 10 μm or greater helps prevent a decrease in physical characteristics, thereby helping to ensure that the first resin layer 101 is not able to easily tear. Maintaining the thickness of the first resin layer 101 at 100 μm or less helps ensure that forming characteristics (such as an injection molding or moldability) are not decreased, and that an electric capacity per unit volume of the rechargeable battery is not also decreased.

The second resin layer 201 may be an intermediate layer acting as a barrier layer that helps reduce the possibility of and/or prevent the electrolyte solution from leaking out of the battery or moisture from penetrating into the battery.

In an implementation, a thickness of the second resin layer 201 may be, e.g., 10 μm to 200 μm or 20 μm to 100 μm. Maintaining the thickness of the second resin layer at 10 μm or greater helps ensure that moisture penetration resistance is not deteriorated and facilitates processing. Maintaining the thickness of the second resin layer at 200 μm or less helps ensure that forming characteristics (such as an injection molding or moldability) are not decreased, and that an electric capacity per unit volume of the rechargeable battery is not also decreased.

In an implementation, the second resin layer 201 may include the butyl-based resin.

In an implementation, the butyl-based resin may include, e.g., a poly isobutylene rubber, a copolymer rubber of poly isobutylene and isoprene, a halogenated butyl rubber, an acrylonitrile butadiene rubber, a poly sulfide butadiene rubber, or a styrene butadiene rubber.

In an implementation, the halogenated butyl rubber may include, e.g., a bromo-butyl rubber or a chloro-butyl rubber.

In an implementation, a Young's modulus of the second resin layer may be, e.g., 0.05 MPa to 500 MPa.

In the present specification, the Young's modulus means a value representing a degree to which the second resin layer 201 extends.

For example, if a predetermined force F is applied on both sides of the second resin layer 201 to be elongated, a length may be increased from $L_0$ to $L_n$ and a cross section A may be decreased. Also, the object that is held to be elongated may return to its original shape if the force is removed.

In this case, the degree of the length to which the second resin layer 201 is elongated is referred to as a strain rate S and it may be expressed according to the following Equation 1.

$$S = (L_n - L_0)/L_0 \qquad \text{[Equation 1]}$$

Also, a value of a pull force F when increasing the length of the second resin layer 201 divided by the cross-section A is referred to as a strain force T and it may be expressed according to the following Equation 2.

$$T = F/A \qquad \text{[Equation 2]}$$

In this case, the Young's modulus Y refers a proportional relation between the strain rate and the strain force, e.g., a value represented by Equation 3.

$$\text{Young's modulus } (Y) = T/S \qquad \text{[Equation 3]}$$

In an implementation, a Yield stress of the second resin layer 201 may be, e.g., 0.1 MPa to 100 MPa. In the present specification, the Young's modulus and Yield stress mean the value measured by a general stress-strain curved line, e.g., ASTM D638 or ASTM D3039.

In an implementation, an elastic force (e.g., an elastic elongation) of the second resin layer 201 may be less than 500%, e.g., less than 300% or less than 200%. In the present specification, the elastic force (the elastic elongation) refers to a value by which the Yield strength is measured by the stress-strain curved line measurement and then the maximum possible degree of the deformation is calculated within the measured range.

As described above, in the case 215 including the second resin layer 201 (formed using the butyl-based resin), when applying the case 215 to the rechargeable battery, the second resin layers 201 may have adherence therebetween (e.g., self adhesiveness even though an additional adhesive or a resin layer having a function of the adhesive is not included), and sealing may be realized by methods such as a heat fusion, etc.

Figure 2:
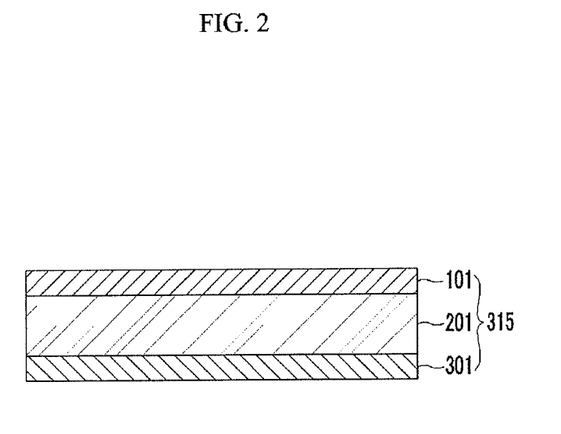

In an implementation, the case for the rechargeable battery may further include a third resin layer 301 on the second resin layer 201.

FIG. 2 illustrates a sectional view of the case 315 for the rechargeable battery that further includes the third resin layer 301.

In an implementation, the third resin layer 301 may be formed of or may include, e.g., a polyolefin or a copolymer of polyolefin. In an implementation, the polyolefin may include, e.g., poly ethylene (PE) or poly propylene (PP).

In an implementation, a thickness of the third resin layer 301 may be, e.g., 5 μm to 100 μm or 10 μm to 50 μm.

Maintaining the thickness within the described ranges helps ensure that formation characteristics, adherence, and/or chemical resistance are not undesirably decreased.

When forming the case including the second resin layer 201 (formed using or including the butyl-based resin), flexibility of the rechargeable battery may be remarkably improved, while still maintaining the excellent chemical resistance and moisture resistance.

Next, the configuration of the rechargeable battery according to the present disclosure will be described.

Figure 3:
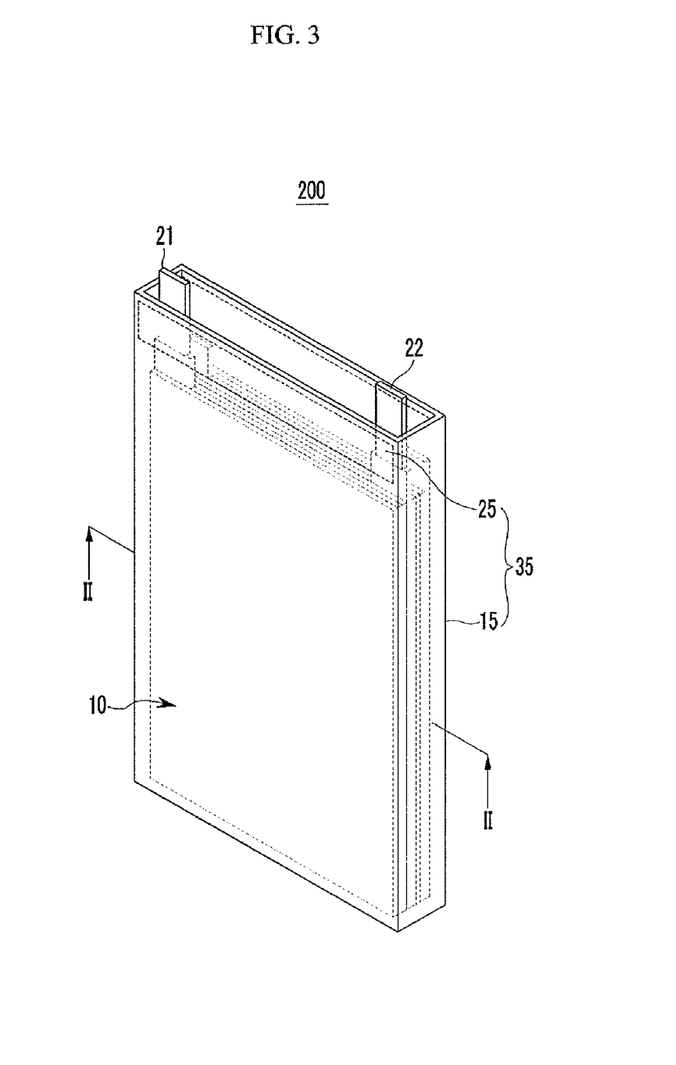
FIG. 3 illustrates a perspective view of a rechargeable battery according to an exemplary embodiment.
Figure 4:
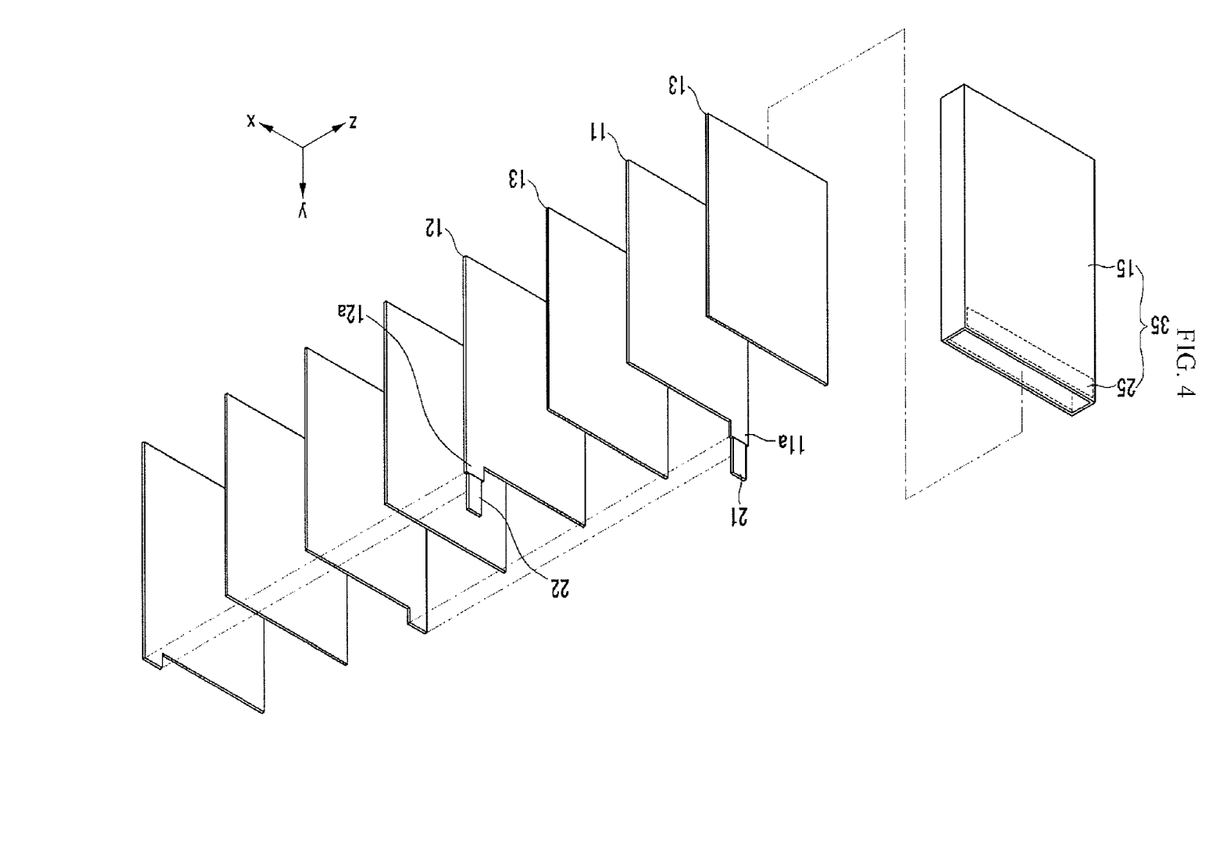
FIG. 4 illustrates an exploded perspective view of the rechargeable battery of FIG. 3.
Figure 5:
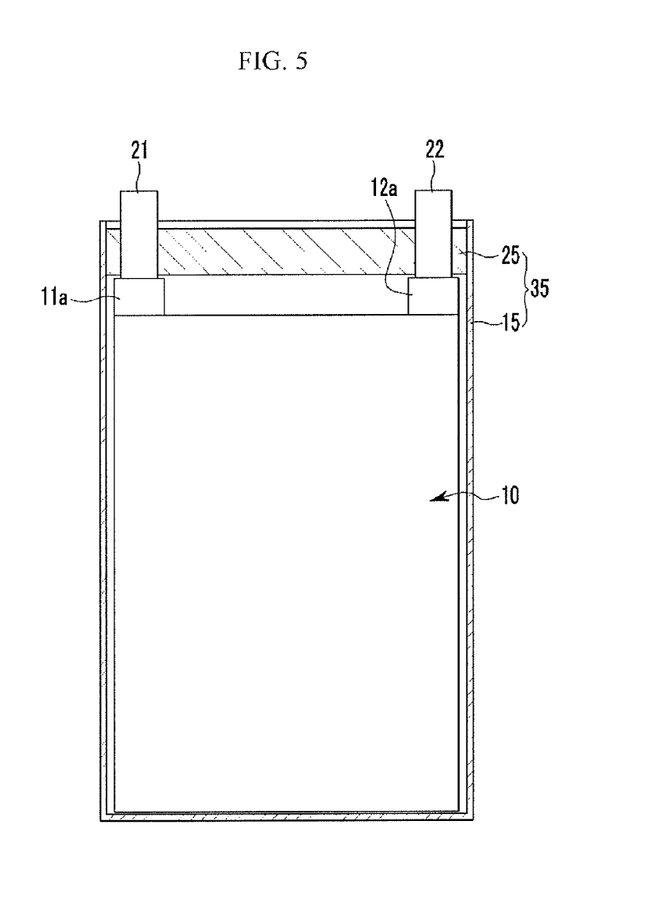
FIG. 5 illustrates a cross-sectional view taken along line II-II of FIG. 3.

FIG. 3 illustrates a perspective view of a rechargeable battery according to an exemplary embodiment, FIG. 4 illustrates an exploded perspective view of the rechargeable battery of FIG. 3, and FIG. 5 illustrates a cross-sectional view taken along line II-II of FIG. 3.

Referring to FIG. 3 to FIG. 5, the rechargeable battery 200 according to an exemplary embodiment may include the electrode assembly 10 and the case 35 receiving the electrode assembly 10. The case 35 may be formed using or may be the above-described cases 215 and 315 according to the present disclosure.

First, the electrode assembly 10 (performing charge and discharge) may be manufactured in a shape in which a separator 13 is interposed between a positive electrode 11 of a first electrode and a negative electrode 12 of a second electrode. In an implementation, the first electrode may be the negative electrode 12, and the second electrode may be the positive electrode 11.

In an implementation, the positive electrode 11 may include a positive electrode current collector (made of a metal thin plate, e.g., aluminum) and a positive electrode active material layer on the positive electrode current collector. The negative electrode 12 may include a negative electrode current collector (made of a metal thin plate, e.g., copper) and a negative active material layer on the negative electrode current collector.

In an implementation, the electrode assembly 10 has a structure in which a plurality of the positive and negative electrodes 11 and 12 are alternately laminated while interposing the separator 13. In this case, the separator 13 is interposed between the positive electrode 11 and the negative electrode 12 while insulating the positive electrode 11 and the negative electrode 12 and providing a path along which an ion is moved. In an implementation, the electrode assembly 10 may have a structure in which the separator 13 is disposed between the positive and negative electrodes 11 and 12, and is wound.

Positive and negative electrode uncoated regions 11a and 12a may be formed at the one side end in the electrode assembly 10. A positive terminal 21 may be attached to the positive electrode uncoated region 11a through welding, and a negative terminal 22 may be attached to the negative electrode uncoated region 12a through welding.

In the rechargeable battery according to an embodiment, the case 35 may be built with or may accommodate the electrode assembly 10. In an implementation, the case 35 may include a first receiving part 15 (receiving or housing the electrode assembly 10 and in which an opening is formed on one side or at one end) and a sealing part 25 sealing the opening.

For example, the first receiving part 15 may be manufactured such that the opening at one side corresponds with a narrow side surface of a hexahedral-shaped structure, e.g., by a suitable method such as the injection molding, etc.

The above-described electrode assembly 10 may be inserted into the opening, and the opening may be sealed by the sealing part 25.

In an implementation, the sealing part 25 may be closed and sealed by a suitable method, e.g., heat fusion via an adhesive along a line at one side of the first receiving part 15 where the opening is positioned.

In an implementation, the sealing part 25 may be formed by directly adhering opposing sides of the case (e.g., of sides forming the first receiving part 15) to be closed and sealed, e.g., without using a separate adhesive. For example, the second resin layer and/or third resin layer may include the butyl-based resin, which may exhibit adhesiveness.

For example, the first receiving part 15 may be manufactured to include the opening that is only positioned at one side of the narrow surface of the case 35 and the electrode assembly 10 is received thereto. Thus, the area to be sealed may be remarkably decreased such that the sealing effect and/or sealing ability may be excellent.

Figure 6:
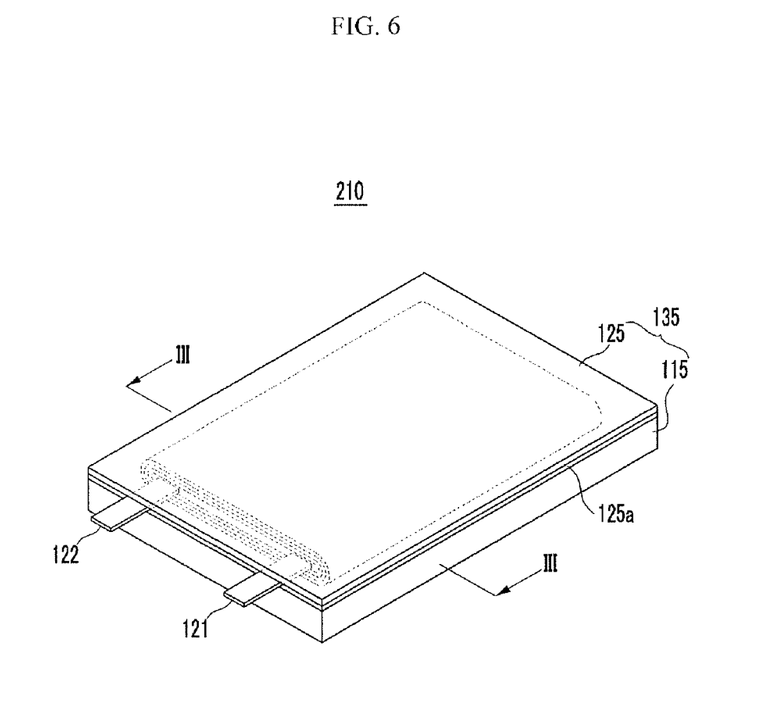
FIG. 6 illustrates a perspective view of a rechargeable battery according to another exemplary embodiment.
Figure 7:
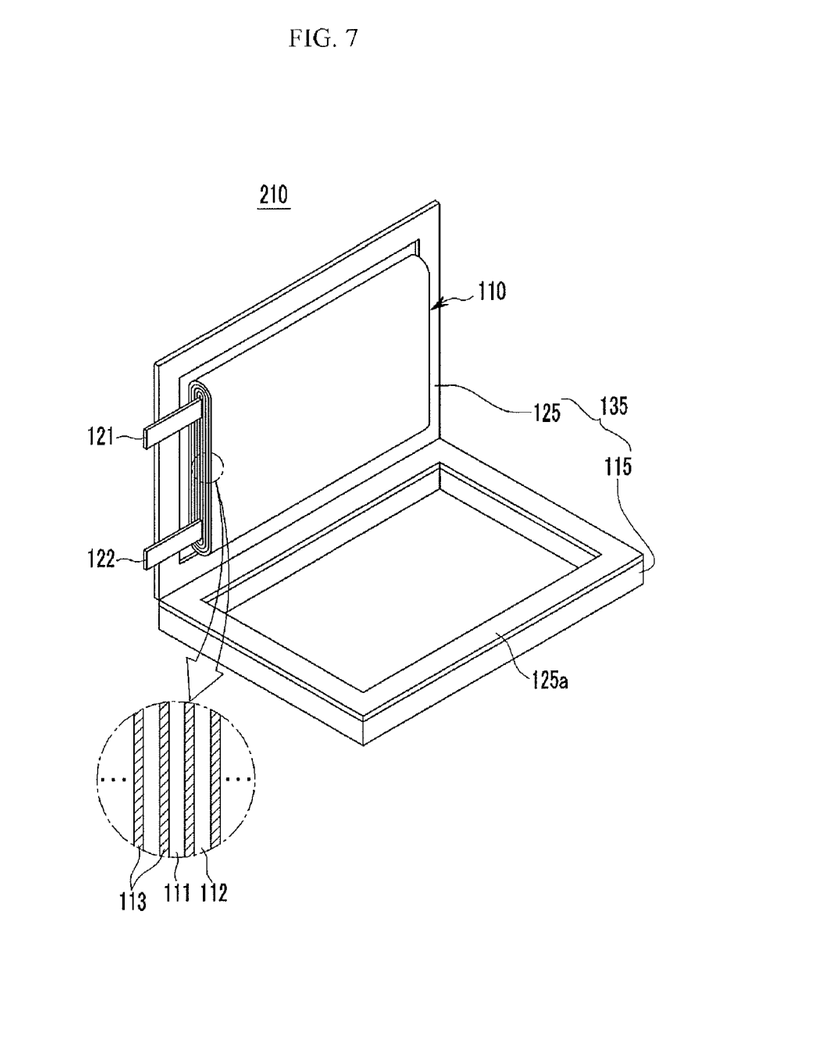
FIG. 7 illustrates an exploded perspective view of the rechargeable battery of FIG. 6.
Figure 8:
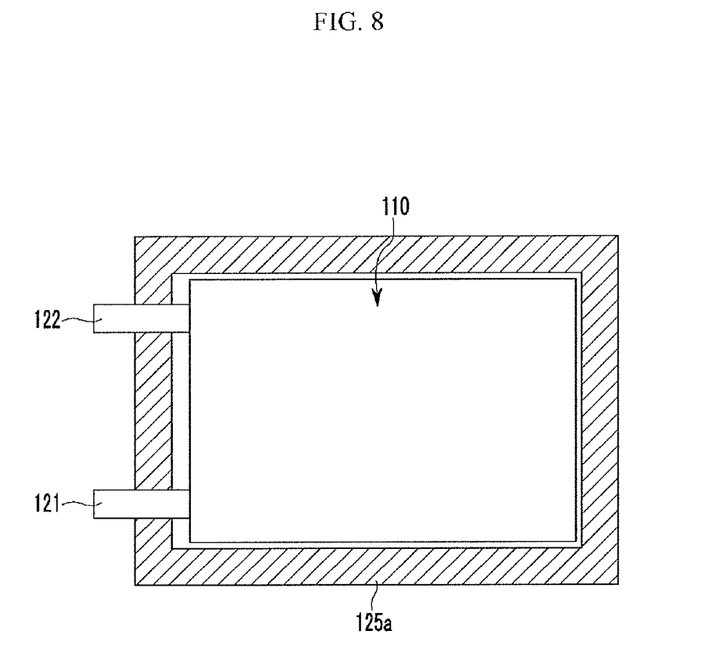
FIG. 8 illustrates a cross-sectional view taken along line III-III of FIG. 6.

FIG. 6 illustrates a perspective view of a rechargeable battery according to another exemplary embodiment, FIG. 7 illustrates an exploded perspective view of a rechargeable battery of FIG. 6, and FIG. 8 illustrates a cross-sectional view taken along line III-III of FIG. 6.

Referring to FIG. 6 to FIG. 8, the rechargeable battery 210 according to the present embodiment may include the electrode assembly 110 and the case 135 receiving the electrode assembly 110. The case 135 may be the same as or similar to the above-described cases 215 and 315 according to the present disclosure.

The content related to the positive electrode 11, the negative electrode 12, and the separator 13 forming the electrode assembly 110 may be the same as the above-described.

In an implementation, the electrode assembly 110 may be formed of a structure in which the separator 113 is interposed between the positive electrode 111 and the negative electrode 112, and then the separator 113, the positive electrode 111, and the negative electrode 112 may be spiral-wound and pressed to be slim, or the structure in which a plurality of positive electrodes 111 and negative electrodes 112 of a rectangular sheet shape are alternately deposited via the separator 113.

In the rechargeable battery according to the present embodiment, the case 135 may include a second receiving part 115 (accommodating the electrode assembly 110 and including an opening at one side thereof) and a cover part 125 (closing and sealing the opening of the receiving part 115).

In an implementation, the second receiving part 115 may be manufactured such that the opening is at one side of a wide side surface of the hexahedron-shaped case, e.g., by a forming method.

The electrode assembly 110 may be inserted into the opening, and the opening may be closed and sealed by the cover part 125.

In an implementation, the second receiving part 115 and the cover part 125, as shown in FIG. 6 to FIG. 8, may be sealed via a separate adhesive layer 125a (having a rectangular ring shape along the circumference of the second receiving part 115).

In an implementation, the second receiving part 115 and the cover part 125 may be adhered to be closed and sealed without using a separate adhesive. For example, the second resin layer or third resin layer may include the butyl-based resin, which may exhibit its own adhesiveness.

As described above, the second receiving part 115 may have the structure such that the opening is at one wide side of the case 135 and the electrode assembly 110 is received thereto, and the electrode assembly 110 may be more easily received such that the manufacturing process time may be reduced.

The following Exemplary Embodiments and Comparative Examples are provided in order to highlight characteristics of one or more embodiments, but it will be understood that the Exemplary Embodiments and Comparative Examples are not to be construed as limiting the scope of the embodiments, nor are the Comparative Examples to be construed as being outside the scope of the embodiments. Further, it will be understood that the embodiments are not limited to the particular details described in the Exemplary Embodiments and Comparative Examples.

Exemplary Embodiment 1

A resin layer of nylon/a resin layer of poly isobutylene and copolymer rubber (Butyl Rubber (IIR)) of isoprene/a first adhesive layer were sequentially deposited to manufacture a laminated member.

Exemplary Embodiment 2

A resin layer of poly ethylene terephthalate (PET)/a resin layer of poly isobutylene and copolymer rubber (Butyl Rubber (IIR)) of isoprene/a first adhesive layer were sequentially deposited to manufacture a laminated member.

Exemplary Embodiment 3

A resin layer of poly ethylene (PE)/a resin layer of poly isobutylene and copolymer rubber (Butyl Rubber (IIR)) of isoprene/a first adhesive layer were sequentially deposited to manufacture a laminated member.

Exemplary Embodiment 4

A resin layer of poly ethylene (PE)/a resin layer of poly isobutylene and copolymer rubber (Butyl Rubber (IIR)) of isoprene were sequentially deposited to manufacture a laminated member.

Exemplary Embodiment 5

A resin layer of poly ethylene terephthalate (PET)/a resin layer of poly isobutylene rubber/a first adhesive layer were sequentially deposited to manufacture a laminated member.

Exemplary Embodiment 6

A resin layer of poly ethylene terephthalate (PET)/a resin layer of bromo-butyl rubber/a first adhesive layer were sequentially deposited to manufacture a laminated member.

Exemplary Embodiment 7

A resin layer of poly ethylene terephthalate (PET)/a resin layer of poly isobutylene and copolymer rubber (Butyl Rubber (IIR)) of isoprene/a resin layer of poly ethylene terephthalate (PET)/a resin layer of poly isobutylene and copolymer rubber (Butyl Rubber (IIR)) of isoprene/a first adhesive layer were sequentially deposited to manufacture a laminated member.

Comparative Example 1

A resin layer of nylon/a metal layer of aluminum/a resin layer of poly propylene were sequentially deposited to manufacture a laminated member.

Comparative Example 2

A resin layer of poly ethylene terephthalate (PET)/a first adhesive layer/a resin layer of poly ethylene terephthalate (PET)/a second adhesive layer/a resin layer of poly ethylene terephthalate (PET)/a third adhesive layer/a resin layer of poly ethylene (PE) were sequentially deposited to manufacture a laminated member.

Comparative Example 3

A resin layer of poly ethylene terephthalate (PET)/a first adhesive layer/a resin layer of poly ethylene (PE)/a second adhesive layer/a resin layer of cast poly propylene (cPP) were sequentially deposited to manufacture the laminated member.

Experimental Example 1—Estimated Chemical Resistance

After each sample having a size of 15 mm×100 mm was manufactured using the laminated member according to Exemplary Embodiments 1 to 7 and Comparative Examples 1 to 3, a weight was measured before an electrolyte solution reaction estimation and a sample was put together with an $LiPF_6$ electrolyte solution (Leechem company product) in a test vessel and was sealed, and the samples were put in an oven at 85° C. and the samples were removed after four hours to observe separation between the films by the naked eye and a weight change, thereby estimating chemical resistance. A case in which separation did not occur is represented by "○", a case in which partial separation occurred is represented by "Δ", and a case in which separation occurred is represented by "x".

TABLE 1

| Division | After 85° C., 4 hr reaction | |
|---|---|---|
| Exemplary Embodiment 1 | Δ | nylon resin layer reaction |
| Exemplary Embodiment 2 | ○ | |
| Exemplary Embodiment 3 | ○ | |
| Exemplary Embodiment 4 | ○ | |
| Exemplary Embodiment 5 | ○ | |
| Exemplary Embodiment 6 | ○ | |
| Exemplary Embodiment 7 | ○ | |
| Comparative Example 1 | X | nylon resin layer reaction |
| Comparative Example 2 | ○ | |
| Comparative Example 3 | X | the second adhesive layer reaction |

In Table 1, in the laminated member including two or more resin layers, it may be seen that the laminated member according to Exemplary Embodiments 1 to 7 (including at least one layer that included the butyl-based resin) had excellent material characteristics in the estimated chemical resistance.

In contrast, in the case of the laminated member according to Comparative Example 1 (including the metal layer), the resin layer of nylon reacted such that separation occurred. In the case of the laminated member according to Comparative Example 3 (including the resin layer made of poly ethylene (PE) in the middle layer), the second adhesive layer reacted such that separation occurred.

Accordingly, when using the laminated member including a butyl-based resin layer, it may be seen that the chemical resistance is excellent.

Experimental Example 2—Estimated Moisture Resistance

After manufacturing each sample having a size of 100 mm×100 mm using the laminated member according to Exemplary Embodiments 1 to 7 and Comparative Examples 1 to 3, the samples were fixed to a holder, a predetermined amount of moisture was continually sprayed on one side surface thereof to pass through the film, and the moisture amount detected on the other side was measured by a sensor to be quantified as a value. The value is shown in Table 2 below and FIG. 9.

TABLE 2

| Division | WVTR (g/m²day) |
| --- | --- |
| Exemplary Embodiment 1 | 0.01 |
| Exemplary Embodiment 2 | 0.005 |
| Exemplary Embodiment 3 | 0.007 |
| Exemplary Embodiment 4 | 0.009 |
| Exemplary Embodiment 5 | 0.003 |
| Exemplary Embodiment 6 | 0.004 |
| Exemplary Embodiment 7 | 0.0005 |
| Comparative Example 1 | 0.1 |
| Comparative Example 2 | 0.05 |
| Comparative Example 3 | 0.1 |

Figure 9:
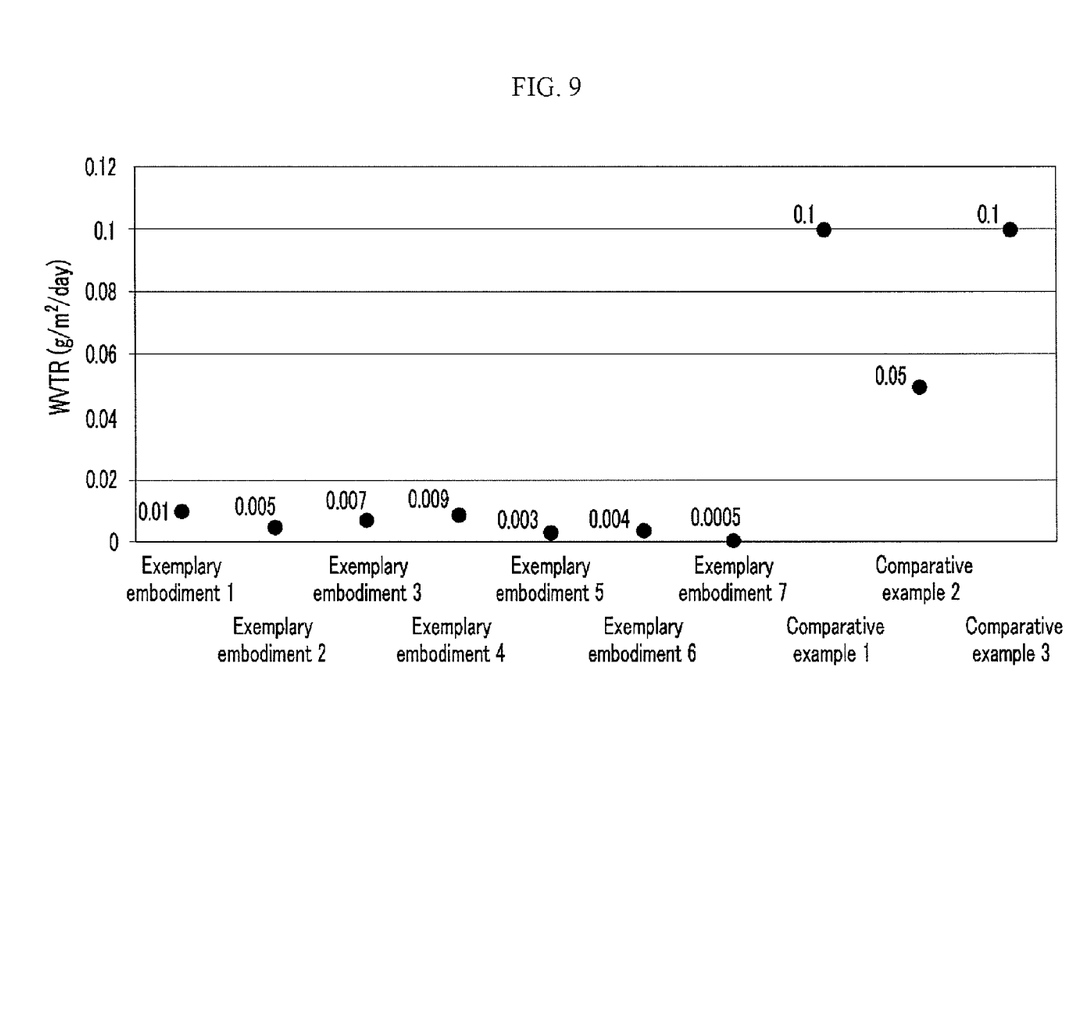
FIG. 9 illustrates a graph showing an estimated result of moisture resistance permeability according to Exemplary embodiments 1 to 7 and Comparative examples 1 to 3.

In Table 2 and FIG. 9, it may be seen that the laminated member according to Exemplary Embodiments 1 to 7 (including at least one layer in the laminated member that includes a butyl-based resin) exhibited excellent moisture resistance compared with the laminate member according to Comparative Example 1 (including the metal layer) and Comparative Examples 2 and 3 (including a resin layer that did not include a butyl-based resin).

By way of summation and review, a pouch-type case may be especially appropriate for cell manufacturing with a thin thickness and the structure is simple, such that there may be a benefit in that the manufacturing is easy, and thus it may be widely used. Some pouch-type cases may easily generate corrosion during charge and discharge process, which may deteriorate flexibility. The embodiments may provide a case utilizing a new configuration to meet the needs of the present market.

The case for the rechargeable battery according to an embodiment may include the second resin layer formed by using the butyl-based resin (instead of a metal thin layer) such that the chemical resistance is excellent.

Also, when using the case according to an embodiment to form a battery, a rechargeable battery having excellent flexibility may be obtained.

The embodiments may provide a case for a rechargeable battery having excellent chemical resistance and flexibility.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

101: first resin layer
201: second resin layer
301: third resin layer
215, 315: case
200, 210: rechargeable battery
10, 110: electrode assembly
21, 121: positive electrode terminal
22, 122: negative terminal
25: sealing part
35, 135: case
15: first receiving part
25: sealing part
115: second receiving part
125*a*: adhesive layer
125: cover part
11, 111: positive electrode
11*a*: positive electrode uncoated region
12, 112: negative electrode
12*a*: negative uncoated region
13, 113: separator

What is claimed is:

1. A rechargeable battery, comprising:
an electrode assembly consisting of a separator between a positive electrode and a negative electrode; and
a pouch-type case receiving the electrode assembly along with an electrolyte,
wherein the pouch-type case includes a sequentially arranged first resin layer and second resin layer such that the first resin layer directly contacts the second resin layer and the electrode assembly directly contacts an inner surface of the pouch-type case,
wherein the second resin layer includes a halogenated butyl rubber, the halogenated butyl rubber including a bromo-butyl rubber or a chloro-butyl rubber
wherein the first resin layer includes polyethylene terephthalate, polybutylene terephthalate, a copolyester, a polycarbonate, or a nylon film,
wherein a thickness of the second resin layer is 20 μm to 100 μm, and
wherein the pouch-type case has a multilayer structure in which layers of the multilayer structure do not include a metal layer.

2. The rechargeable battery as claimed in claim 1, wherein:
the pouch-type case includes a first receiving part and a sealing part,
the first receiving part accommodates the electrode assembly and includes an opening at one side thereof, and
the sealing part seals the opening.

3. The rechargeable battery as claimed in claim 2, wherein the sealing part includes directly adhered parts of the pouch-type case at an end of the first receiving part.

4. The rechargeable battery as claimed in claim 1, wherein:
the pouch-type case includes a second receiving part and a cover part, the second receiving part accommodates the electrode assembly and includes an opening at one side thereof, and the cover part closes and seals the opening.

5. The rechargeable battery as claimed in claim 4, wherein the second receiving part is directly adhered to the cover part to closed and sealed.

6. The rechargeable battery as claimed in claim 1, wherein the first resin layer is an outer side of the pouch-type case and the second resin layer is on an interior side of the first resin layer.

7. The rechargeable battery as claimed in claim 1, wherein the pouch-type case further includes a third resin layer, wherein the first resin layer is on one surface of the second resin layer and the third resin layer is on another surface of the second resin layer.

8. The rechargeable battery as claimed in claim 7, wherein the third resin layer includes a polyolefin or a copolymer of polyolefin.

9. The rechargeable battery as claimed in claim 8, wherein the polyolefin is poly ethylene or poly propylene.

10. The rechargeable battery as claimed in claim 1, wherein the first resin layer has a thickness of 10 μm to 100 μm.

11. The rechargeable battery as claimed in claim 1, wherein a Young's modulus of the second resin layer is 0.05 MPa to 500 MPa.

12. The rechargeable battery as claimed in claim 1, wherein a yield stress of the second resin layer is 0.1 MPa to 100 MPa.

13. The rechargeable battery as claimed in claim 1, wherein an Elastic elongation of the second resin layer is less than 500%.

* * * * *